United States Patent
Herman et al.

(10) Patent No.: US 11,174,766 B2
(45) Date of Patent: *Nov. 16, 2021

(54) AIR-OIL SEPARATOR WITH JET-ENHANCED IMPACTION AND METHOD ASSOCIATED THEREWITH

(71) Applicant: CUMMINS FILTRATION IP, INC., Columbus, IN (US)

(72) Inventors: Peter K. Herman, Stoughton, WI (US); Christopher E. Holm, Madison, WI (US); Arun Janakiraman, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,466

(22) Filed: Jul. 6, 2020

(65) Prior Publication Data
US 2020/0332686 A1 Oct. 22, 2020

Related U.S. Application Data

(63) Continuation of application No. 15/880,302, filed on Jan. 25, 2018, now Pat. No. 10,718,242, which is a
(Continued)

(51) Int. Cl.
*B01D 45/00* (2006.01)
*F01M 13/04* (2006.01)
(Continued)

(52) U.S. Cl.
CPC ............. *F01M 13/04* (2013.01); *B01D 45/04* (2013.01); *B01D 45/08* (2013.01); *B01D 45/12* (2013.01);
(Continued)

(58) Field of Classification Search
CPC .......... F01M 13/04; F01M 2013/0438; F01M 2013/0433; B01D 50/002; B01D 46/10;
(Continued)

(56) References Cited

U.S. PATENT DOCUMENTS 3,957,465 A 5/1976 Pircon
4,235,606 A 11/1980 Becker et al.
(Continued)

FOREIGN PATENT DOCUMENTS

EP 0 444 94 A1 1/1982
WO WO-2009/037496 A2 3/2009

OTHER PUBLICATIONS

International search report and written opinion for PCT/US2014/032027, dated Aug. 12, 2014, 8 pages.
(Continued)

*Primary Examiner* — Dung H Bui
(74) *Attorney, Agent, or Firm* — Foley & Lardner LLP

(57) ABSTRACT

The combination of a gas-pressure-driven pump jet nozzle or alternatively Coanda effect nozzle with an impactor nozzle(s) in an air-oil separator for separating oil from blow-by gasses from a crankcase of an internal combustion engine, or for separating liquid aerosol from gas, in general. Such combination enhances impaction efficiency and enables operation at higher pressure differentials (or pressure drop) ("dP") without causing excessive backpressure in the air-oil separator.

18 Claims, 10 Drawing Sheets

Figure 1:
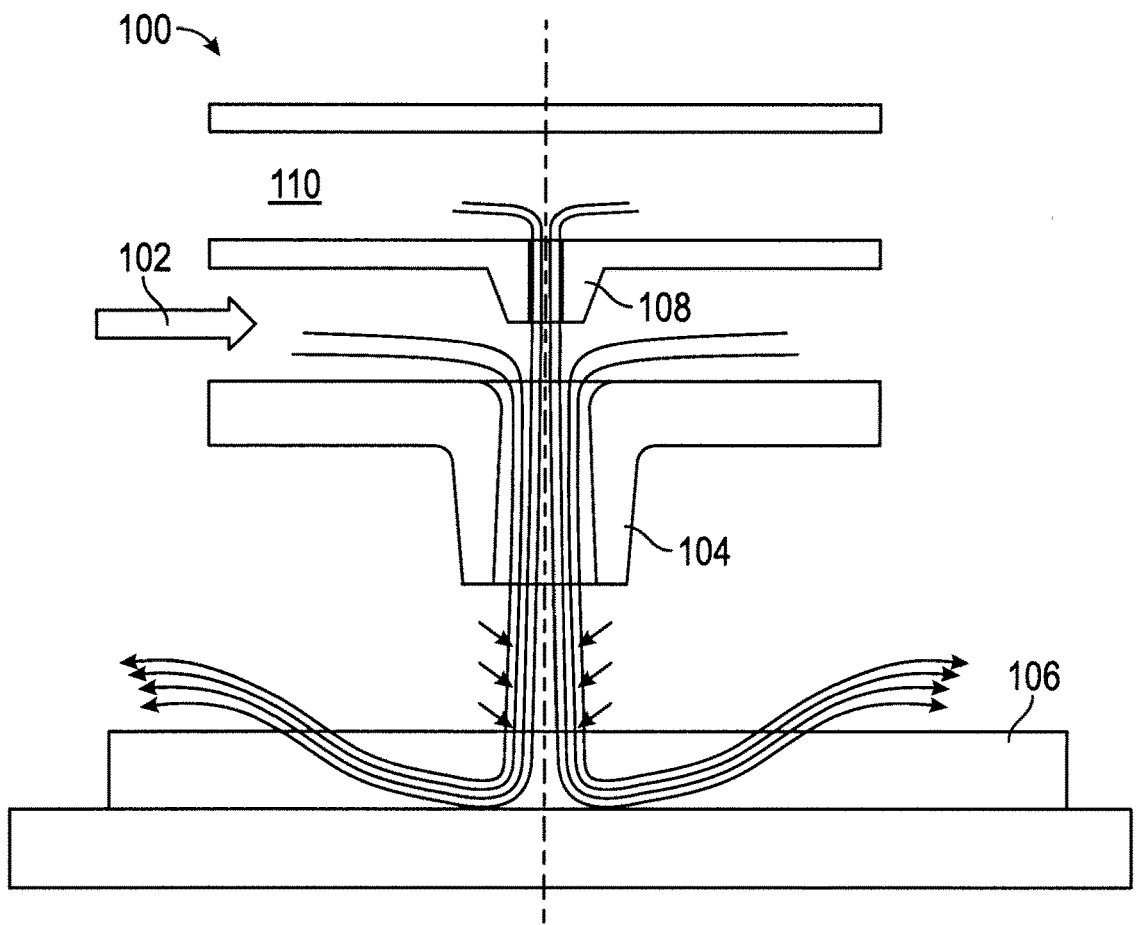

Related U.S. Application Data continuation of application No. 14/780,076, filed as application No. PCT/US2014/032027 on Mar. 27, 2014, now Pat. No. 9,879,578.

(60) Provisional application No. 61/806,040, filed on Mar. 28, 2013.

(51) Int. Cl.
  B01D 45/08 (2006.01)
  B01D 45/12 (2006.01)
  B01D 45/04 (2006.01)
  B01D 46/10 (2006.01)
  B01D 50/00 (2006.01)
  F02M 35/022 (2006.01)

(52) U.S. Cl.
  CPC ............ B01D 46/10 (2013.01); B01D 50/002 (2013.01); B01D 45/00 (2013.01); F01M 2013/0433 (2013.01); F01M 2013/0438 (2013.01); F02M 35/022 (2013.01)

(58) Field of Classification Search
  CPC ........ B01D 45/04; B01D 45/12; B01D 45/00; B01D 45/08; F02M 35/022
  See application file for complete search history.

(56) References Cited

U.S. PATENT DOCUMENTS

| | | |
|---|---|---|
| 4,861,352 A | 8/1989 | Cheng |
| 5,041,146 A | 8/1991 | Simmerlein-Erlbacher |
| 5,669,366 A | 9/1997 | Beach et al. |
| 6,058,917 A | 5/2000 | Knowles |
| 6,101,886 A | 8/2000 | Brenizer et al. |
| 6,120,573 A | 9/2000 | Call et al. |
| 6,135,367 A | 10/2000 | Hsu |
| 6,290,738 B1 | 9/2001 | Holm |
| 6,521,010 B1 | 2/2003 | Katata |
| 6,925,993 B1 | 8/2005 | Eliasson et al. |
| 7,165,541 B2 * | 1/2007 | Hommes ............ F01M 13/0416 123/572 |
| 7,614,390 B2 | 11/2009 | Holzmann et al. |
| 7,699,069 B2 | 4/2010 | Mason |
| 7,896,946 B1 | 3/2011 | Steffen et al. |
| 8,146,574 B2 | 4/2012 | Heckel et al. |
| 8,152,884 B2 | 4/2012 | Severance et al. |
| 8,191,537 B1 | 6/2012 | Moy et al. |
| 8,607,767 B2 * | 12/2013 | Ruppel ................ F01M 13/022 123/572 |
| 2006/0080948 A1 * | 4/2006 | Rodgers ................ B01D 45/12 55/434 |
| 2009/0288475 A1 | 11/2009 | Ariessohn et al. |
| 2010/0024366 A1 | 2/2010 | Hodges et al. |
| 2010/0089183 A1 | 4/2010 | Solomon |
| 2010/0107616 A1 * | 5/2010 | Janakiraman ............ F01N 3/05 60/317 |
| 2010/0300297 A1 | 12/2010 | Ng et al. |
| 2012/0159912 A1 | 6/2012 | Ruppel |
| 2013/0062276 A1 * | 3/2013 | Barreteau ............ B01D 46/125 210/493.5 |
| 2014/0059985 A1 | 3/2014 | Janakiraman et al. |
| 2014/0182568 A1 * | 7/2014 | Hwang .................. F01M 13/04 123/572 |
| 2014/0182569 A1 * | 7/2014 | Hwang .................. F01M 13/04 123/572 |

OTHER PUBLICATIONS

Office Action issued for Indian Patent Application No. 6128/CHENP/2015, dated Mar. 27, 2019, 6 pages.
Office Action issued in Chinese Patent App. No. 2014800177669, dated Jul. 5, 2016.

* cited by examiner

Comparison between 3.3 mm and 7 mm Mixing Bore Velocity Magnitude Fields (m/s)

Close Up of the Narrow Gap and Rounded Edge Plus Lip that Creates Cylindrical Jet Which Adheres to the Mixing Bore Wall due to the Coanda Effect Coanda Nozzle Concept with Flow Pathlines Colored by Velocity Magnitude

AIR-OIL SEPARATOR WITH JET-ENHANCED IMPACTION AND METHOD ASSOCIATED THEREWITH

CROSS-REFERENCE TO RELATED APPLICATIONS

The present application is a continuation of U.S. patent application Ser. No. 15/880,302, filed Jan. 25, 2018, which is a continuation from U.S. patent application Ser. No. 14/780,076, filed Sep. 25, 2015, now U.S. Pat. No. 9,879,578, which is the U.S. National Stage of PCT Application No. PCT/US2014/032027, filed Mar. 27, 2014, which claims the benefit of and priority to U.S. Provisional Patent Application Ser. No. 61/806,040 filed Mar. 28, 2013. The contents of these applications are hereby incorporated by reference in their entirety.

FIELD

The present disclosure relates to systems and methods for inertial impaction in air-oil separators used with crankcase ventilation systems and other gas-liquid separation applications.

BACKGROUND

Inertial gas-liquid separators remove and coalesce liquid particles from a gas-liquid stream. In a crankcase ventilation application, it is desired to vent combustion blow-by gases from a crankcase of an engine. Untreated, these gases contain particulate matter in the form of oil mist and soot. It is desirable to control the concentration of the contaminants, especially if the blow-by gases are to be recirculated back into the engine's air intake system. The oil mist droplets are generally less than 5 microns in diameter, and hence are difficult to remove using conventional fibrous filter media while at the same time maintaining low flow resistance as the media collects and becomes saturated with oil and contaminants.

A gas-liquid separator in a crankcase ventilation application can be used as an air-oil separator. An air-oil separator includes a housing having an inlet for receiving an air-oil stream from an engine crankcase, and an outlet for discharging an air stream to, for example, an air intake manifold. A nozzle structure in the housing has a plurality of nozzles (holes) receiving the air-oil stream from the inlet and accelerating the air-oil stream through the nozzles. An inertial impactor in the housing is in the path of the accelerated air-oil stream and causes a sharp directional change of the air-oil stream. The sharp directional change causes oil particles to separate from the air.

U.S. Pat. No. 6,290,738 discloses an inertial gas-liquid separator including a housing having an inlet for receiving a gas-liquid stream, and an outlet for discharging a gas stream. A nozzle structure in the housing has a plurality of nozzles receiving the gas-liquid stream from the inlet and accelerating the gas-liquid stream through the nozzles. An inertial collector in the housing in the path of the accelerated gas-liquid stream causes a sharp directional change thereof and in preferred form has a rough porous collection surface (collection media) causing liquid particle separation from the gas-liquid stream of smaller size liquid particles than a smooth non-porous impactor impingement surface and without the sharp cut-off size of the latter, to improve overall separation efficiency including for smaller liquid particles. Various housing configurations and geometries are provided.

U.S. Pat. No. 7,699,029 discloses a crankcase ventilation system for an internal combustion engine having a jet pump suctioning scavenged separated oil from the oil outlet of an air/oil separator and pumping same to the crankcase. The jet pump supplies pumping pressure greater than the pressure differential between the higher pressure crankcase and the lower pressure oil outlet, to overcome such pressure differential and the back flow tendency otherwise caused thereby, and instead cause suctioning of scavenged separated oil from the oil outlet and pumping same to the crankcase.

U.S. Pat. No. 7,870,850 discloses a crankcase ventilation system for an internal combustion engine having a jet pump suctioning scavenged separated oil from the oil outlet of an air/oil separator and pumping same to the crankcase.

U.S. Pat. No. 8,202,339 discloses an inertial gas-liquid impactor separator including an inertial impactor collector having an impactor surface extending diagonally relative to axially accelerated flow, which surface is preferably a cone having a leading tip axially facing and axially aligned with the acceleration nozzle. In a further aspect, first and second inertial impactor collectors are provided in series, with an orifice in the first inertial impactor collector providing a nozzle for the second inertial impactor collector. Improved performance is provided by reducing the extent of the stagnation region to change from a narrow band particle size range to a wider band range and to shift cut-off size. An inertial gas-liquid impactor separator has a perforated layer of coalescence media having at least one aperture through which the gas-liquid stream flows. Improved performance is provided by increased penetration of the flow into the media patch and thereby enhancing particle capture by interception, impaction and diffusion.

U.S. Pat. No. 8,191,537 discloses a crankcase ventilation system for an internal combustion engine including a separator and an amplifier increasing at least one of flow and pressure along the flow path through the separator to provide higher separation efficiency.

SUMMARY

A first embodiment relates to a gas-liquid separator. The gas-liquid separator comprises a housing having an inlet for receiving a gas-liquid stream and an impactor nozzle plate supported by the housing and situated downstream of the inlet, the impactor nozzle plate receiving the gas-liquid stream. An impactor nozzle extends through the impactor nozzle plate and provides a passage for the gas-liquid stream to pass through the impactor nozzle plate, thereby creating a pressure differential between an upstream end of the impactor nozzle and a downstream end of the impactor nozzle when the gas-liquid stream is passed through the impactor nozzle plate. A pressurized gas jet nozzle injects a high-velocity gas stream into the gas-liquid stream so as to decrease the pressure differential.

Another embodiment relates to methods and systems for enhancing collection of liquid particles in an inertial gas-liquid separator. In the methods and systems, a first stream of gas mixed with liquid particles is received and directed through an impactor nozzle and at a collection media, thereby creating a pressure differential between an upstream end of the impactor nozzle and a downstream end of the impactor nozzle when the first stream is directed through the impactor nozzle. Subsequently in the methods and systems, a second stream of gas is injected into the first stream so as to decrease the pressure differential and increase a velocity of the liquid particles as the first stream is directed at the collection media.

A further embodiment relates to a gas-liquid separator. The gas-liquid separator includes an impactor nozzle receiving a gas-liquid stream and providing a passage for the gas-liquid stream to pass through the impactor nozzle, thereby creating a pressure differential between an upstream end of the impactor nozzle and a downstream end of the impactor nozzle when the gas-liquid stream is passed through the impactor nozzle plate. The gas-liquid separator further includes a plenum surrounding the impactor nozzle, the plenum providing a stream of pressurized air to the impactor nozzle. The gas-liquid separator includes a jet nozzle injecting the stream of pressurized air into the passage.

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

BRIEF DESCRIPTION OF THE FIGURES

FIG. 1 shows a cross sectional view of a central jet system of a gas-liquid separator for a crankcase ventilation ("CV") system according to an exemplary embodiment.

FIG. 2 shows another cross sectional view of the central jet system of FIG. 1.

FIG. 3 shows a perspective view of the central jet system of FIG. 1 within a housing.

FIG. 4 shows a cross sectional view of a central jet system with various boundary conditions of a gas-liquid separator for a CV system according to an exemplary embodiment.

FIGS. 5 through 13 show results of computational fluid dynamics (CFD) modeling of various examples of central jet system of FIG. 4.

FIG. 14 shows a cross sectional view of a ring jet system of a gas-liquid separator for CV system according to an exemplary embodiment.

FIG. 15 shows cross sectional views of the pressurized gas jet nozzle of the ring jet system of FIG. 14.

FIGS. 16-18 show results of CFD modeling of the ring jet system of FIG. 14.

DETAILED DESCRIPTION

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph only if the terms "means for" or "step for" are explicitly recited in the respective limitation.

Disclosed herein are gas-liquid separators and methods and systems associated therewith. The gas-liquid separators and methods and systems associated therewith may be further described based on the following definitions.

Unless otherwise specified or indicated by context, the terms "a", "an", and "the" mean "one or more" or "at least one." For example, "a nozzle" should be interpreted to mean "one or more nozzles."

As used herein, "about", "approximately", "substantially", and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising."

The present disclosure combines a gas-pressure-driven pump jet nozzle or alternatively Coanda effect nozzle with an impactor nozzle(s) in an air-oil separator for separating oil from blow-by gasses from a crankcase of an internal combustion engine, or for separating liquid aerosol from gas, in general. Such combination enhances impaction efficiency and enables operation at higher pressure differentials (or pressure drop) ("dP") without causing excessive back-pressure in the air-oil separator.

Inertial impactor air-oil separators are used for crankcase ventilation ("CV") applications, but their aerosol separation efficiency can be constrained by the allowable crankcase backpressure. Inertial impaction efficiency of aerosol from blow-by gases increases as impaction velocity of the blow-by gases increases. For example, impactor d50 (the aerosol diameter separated at 50% efficiency) decreases with the inverse square root of impaction velocity "U": So increasing impaction velocity by factor of 4 would drop (improve) the d50 cut-size by half (i.e., give a much higher efficiency on a given size distribution aerosol mix).

Impactor *D*50 equation in Hinds "Aerosol Technology" (*Cc*=Cunningham slip correction factor, $\eta$=viscosity, *Dj*=*jet* diameter, $Stk_{50}$=constant of ~0.24 for round nozzle impactor design, $\rho_p$=density of aerosol, *U*=average gas velocity in nozzle). Equation 1:

The particle diameter having 50% collection efficiency, $d_{50}$, can be calculated according to the following equation:

$$d_{50}\sqrt{Cc} = \left[\frac{9\eta D_j(Stk_{50})}{\rho_p U}\right]^{1/2}$$

Pressure differentials across an impactor nozzle also increase with the square of impaction velocity (U). The available pressure-drop to drive the inertial impaction separation process is usually limited by the maximum allowable back pressure. For example, in crankcase ventilation applications, engine seals may fail under higher backpressures within the crankcase, thereby limiting the maximum allowable backpressure to a typical range of 5-20 inches of water ("in $H_2O$", which is equivalent to about 1.25-5 kPa).

The present disclosure describes systems and methods to create a pump assist of the blow-by gases through an impactor nozzle by providing pressurized air via a central jet nozzle and/or Coanda nozzle, thereby creating a higher allowable dP and increased efficiency without necessarily increasing the backpressure within the crankcase. The central jet nozzle has also been shown via computational fluid dynamics ("CFD") modeling to provide an additional boost (beyond the simple dP reduction benefit) to separation efficiency by accelerating liquid particles into a high-velocity central jet within the impactor nozzle, increasing impaction efficiency in an impaction zone.

Crankcase ventilation air is saturated with moisture because it contains combustion by-products. If the air-oil separator is below freezing, this moisture can condense/freeze on the nozzles, causing blocked nozzles, high pressure drop, and other subsequent problems (bypass valve opening, low efficiency, engine de-rate, warning lights, etc.). By utilizing relatively hot post-turbocharger boost air to supply the pressurized air, the nozzle freezing problem can be prevented. In one example, the post-turbocharger boost air is taken before the charge-air cooler. Providing relatively hot air can enable mounting of the air-oil separator at a location remote from the engine. In one example, the air/oil separator is mounted within an air cleaner housing.

Central Jet Arrangement

Referring to FIG. 1, a cross sectional view of a central jet system 100 is shown according to an exemplary embodiment. The central jet system 100 is part of a gas-liquid separator for a CV system. The central jet system 100 receives blow-by gases 102 from a pressurized source (e.g., from a crankcase of an internal combustion engine). The blow-by gases 102 include a mixture of air and oil aerosols. To separate the oil aerosols from the air, the blow-by gases 102 are passed through an impactor nozzle 104 and onto a porous impaction surface 106. The porous impaction surface 106 may be impermeable or permeable. The central jet system 100 utilizes a central pressurized motive jet nozzle 108. The motive jet nozzle 108 delivers a pressurized and high-velocity jet of clean air (i.e., a "core jet") into the impactor nozzle 104 to create a strong vacuum/mixing effect thereby creating a pumping effect that accelerates the blow-by gasses towards the porous impaction surface 106 (i.e., the core jet reduces pressure drop caused by the flow of blow-by gases 102 through the impactor nozzle 104, enabling the blow-by gases 102 to impact the porous impaction surface 106 with a higher velocity, which increases separation efficiency of the aerosols from the blow-by gases 102). A pressurized air chamber 110 provides pressurized clean air to the motive jet nozzle 108 to inject a high-velocity air stream into the stream of blow by gases 102 at the upstream end of the impactor nozzle 104. In some arrangements, the air in the pressurized air chamber 110 may have a pressure of approximately 30 psig. The air in the pressurized air chamber 110 may be fed from a turbo charger of an internal combustion engine. The resulting mixed jet of clean air and blow-by gases 102 may experience a Bernoulli effect that causes the blow-by gases 102 to move radially inward (i.e., approaching the central axis 112), which has a secondary benefit of increasing the depth of penetration of the blow-by gases 102 into the porous impaction surface 106, thereby further increasing efficiency of the central jet system 100 beyond the simple "dP equivalent" operating condition.

Still referring to FIG. 1, the motive jet nozzle 108 is axially aligned with the impactor nozzle 104 along axis 112. In an alternative arrangement, the motive jet nozzle 108 is not axially aligned with the impactor nozzle 104. In further arrangements, the motive jet nozzle 108 can range from being axially aligned (as shown in FIG. 1) with the impactor nozzle 104 to being displaced almost up to the point of tangency with the impactor nozzle 104 before pumping performance of the system of the present disclosure is no longer enhanced. Accelerating the stream of blow-by gases 102 with the high-velocity gas jet reduces a pressure differential between an upstream end of the impactor nozzle 104 and a downstream end of the impactor nozzle 104, thereby enabling higher impaction velocity of the blow-by gases against the porous impaction surface. The geometry of the motive jet nozzle 108 provides a flow rate to enable a dP reduction in excess of 20 in $H_2O$ for the by-pass gases 102 (i.e., crankcase pressure is neutral despite an equivalent nozzle dP of greater than 30 in $H_2O$ if the motive flow were shut off).

Figure 2:
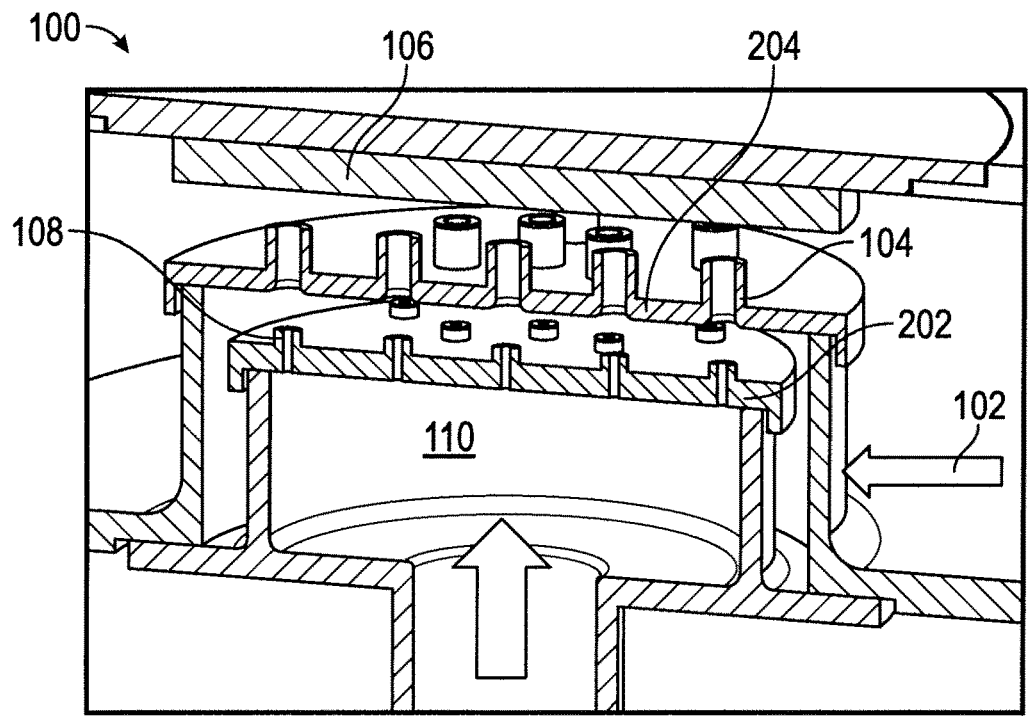

Referring to FIG. 2, another cross sectional view of the central jet system 100 may include a plurality of pressurized motive jet nozzles 108 and a plurality of impactor nozzles 104. The plurality of motive jet nozzles 107 may be formed by drilling or molding small orifice hole(s) in a manifold plate 202. The manifold plate 202 is spaced from the impactor nozzle plate 204. The impactor nozzle plate 204 has orifices extending there through that comprise the impactor nozzles 104.

Figure 3:
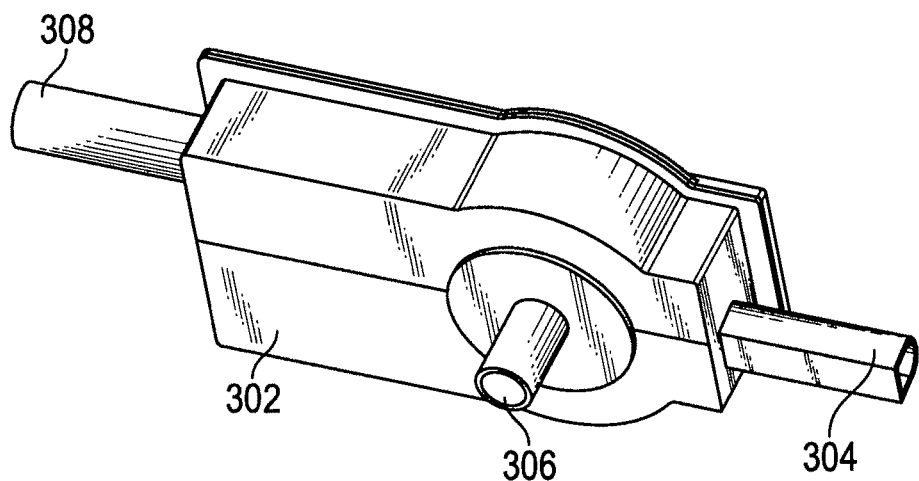

Referring to FIG. 3, a perspective view of the central jet system 100 is shown within a housing 302. As shown in FIG. 3, a gas-liquid stream of blow-by gases 102, such as for example an air-oil stream, enters the housing through the blow-by flow inlet 304. This blow-by gases 102 flows around the outside of the turbo inlet manifold 306 and through the impactor nozzles 104 (as shown in FIG. 2). Meanwhile, clean pressurized air, exhaust, or another suitable gas enters the housing through, for example, the turbo inlet 306. This gas flows through the motive central jet nozzles 108 (as shown in FIG. 2). The motive central jet nozzles create a stream of high-velocity gas that is pumped into the air-oil stream at an upstream end of the impactor nozzle 104. The high-velocity gas stream and air-oil stream then pass through the impactor nozzles 104 and hit the porous impaction surface 106. Oil aerosol particles stick to the porous impaction surface 106, while air flows radially outwardly after changing direction upon hitting the porous impaction surface. This air exits the housing through the outlet 308.

Figure 4:
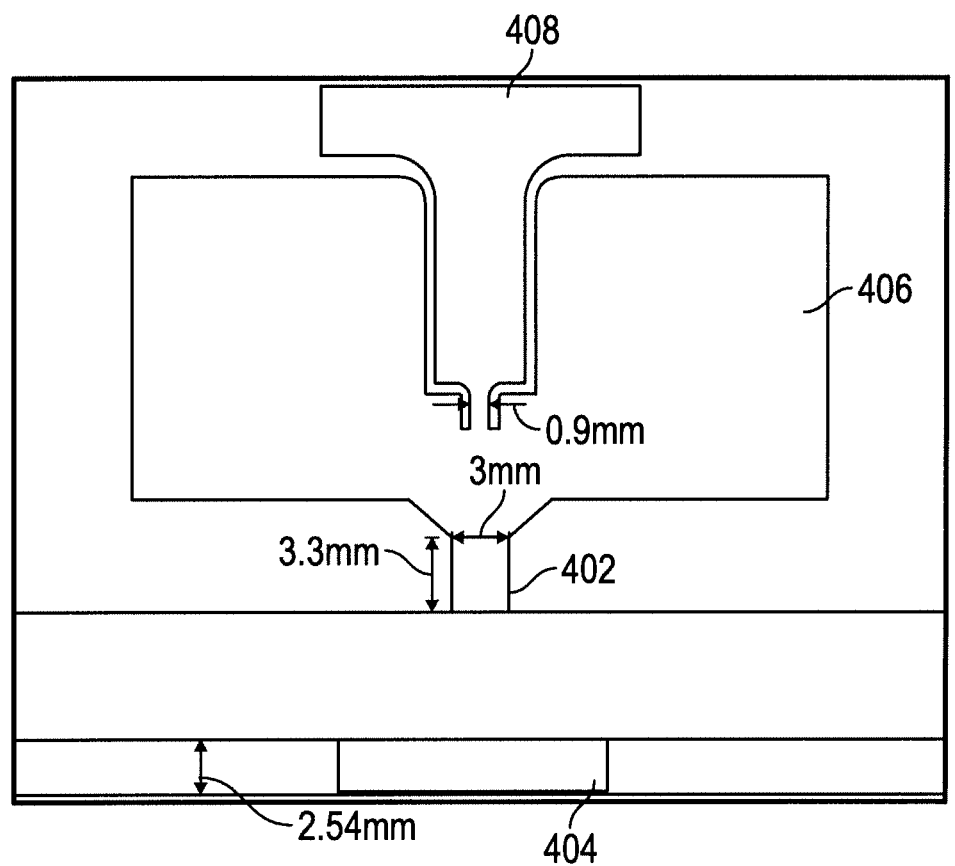
Figure 5:
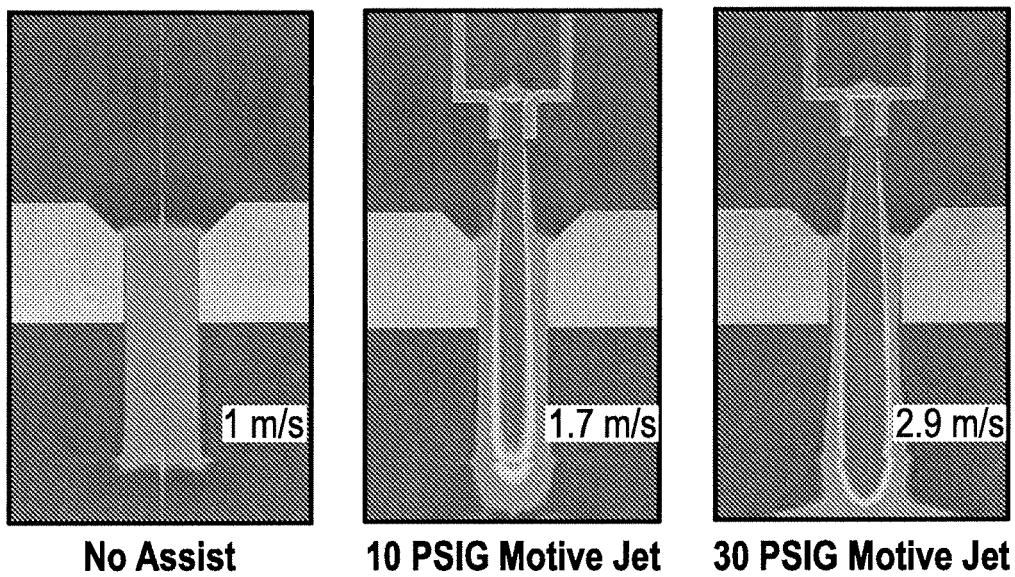
Figure 6:
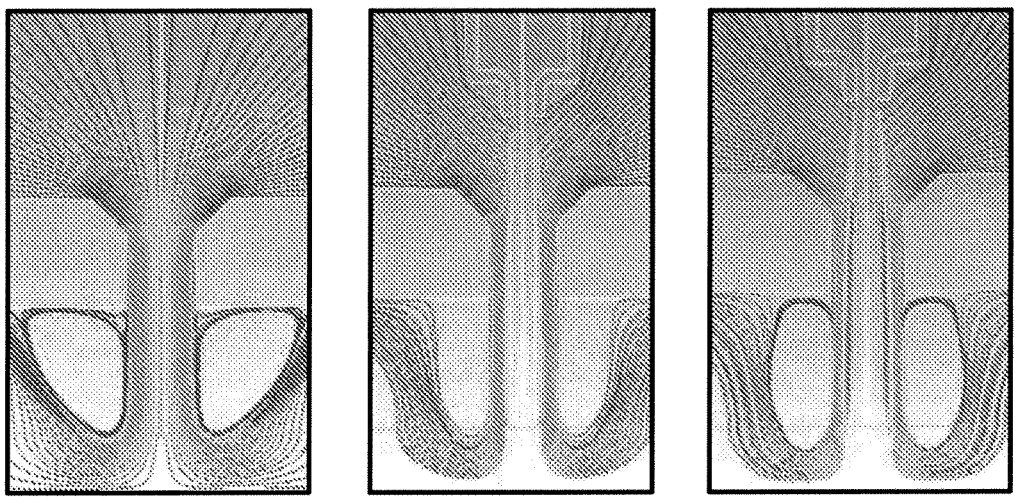
Figure 7:
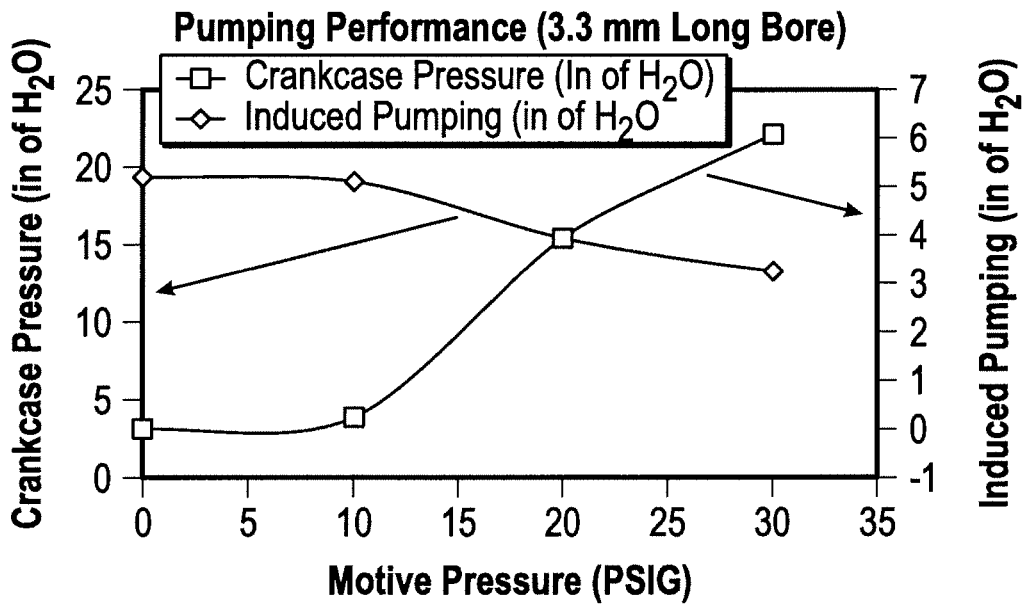
Figure 8:
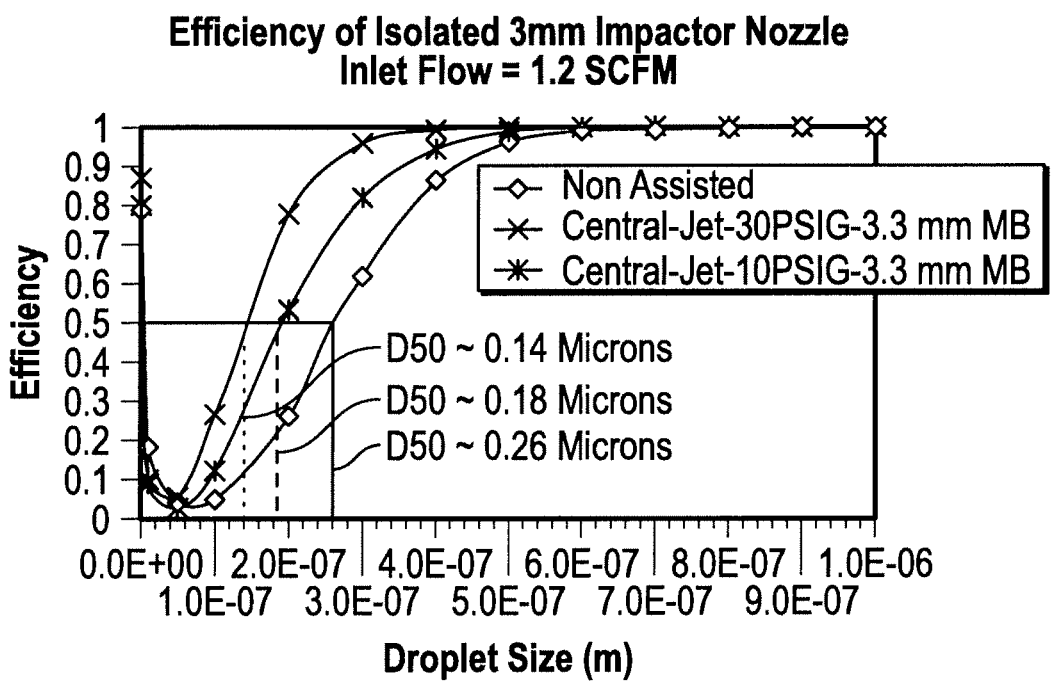
Figure 9:
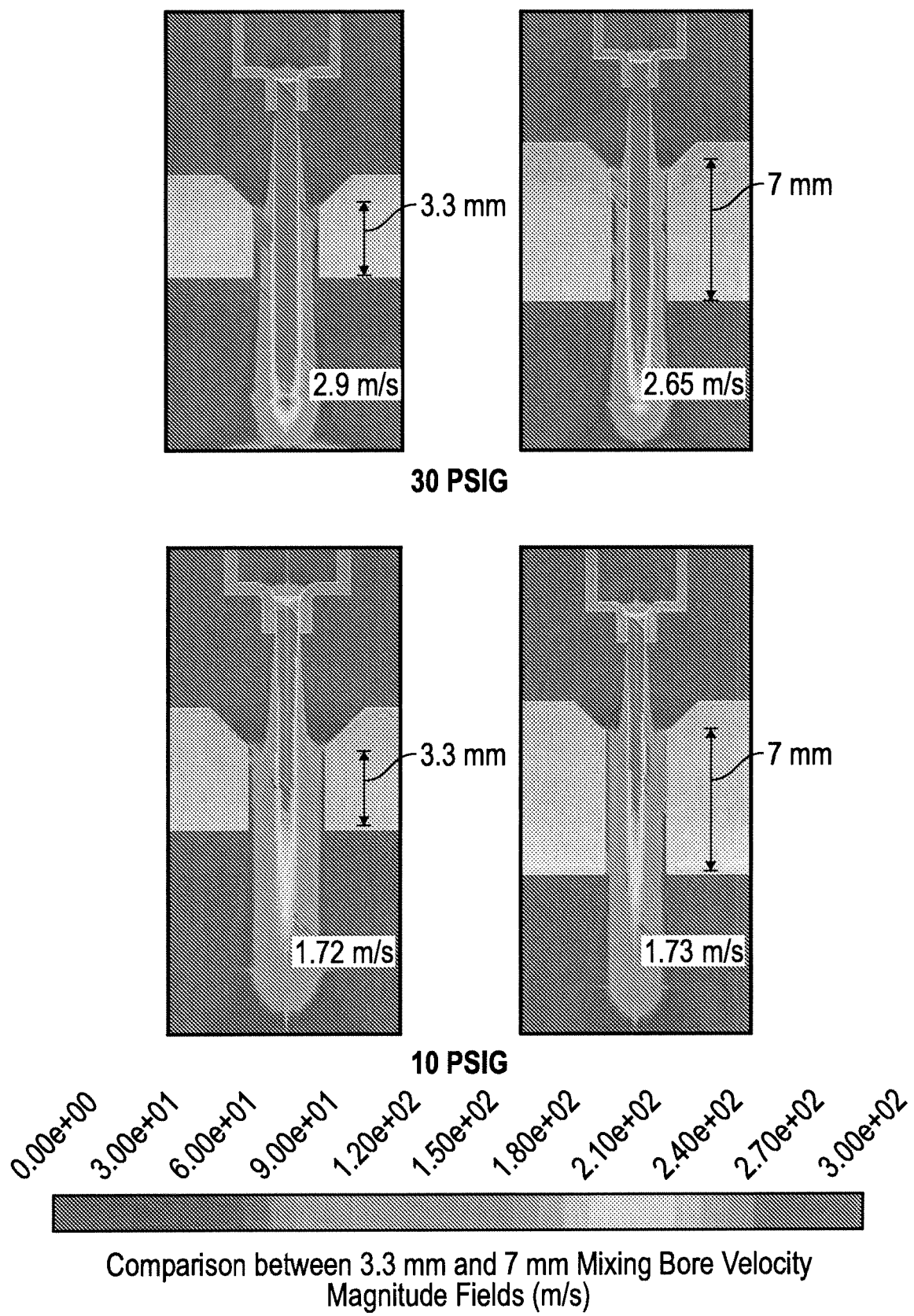
Figure 10:
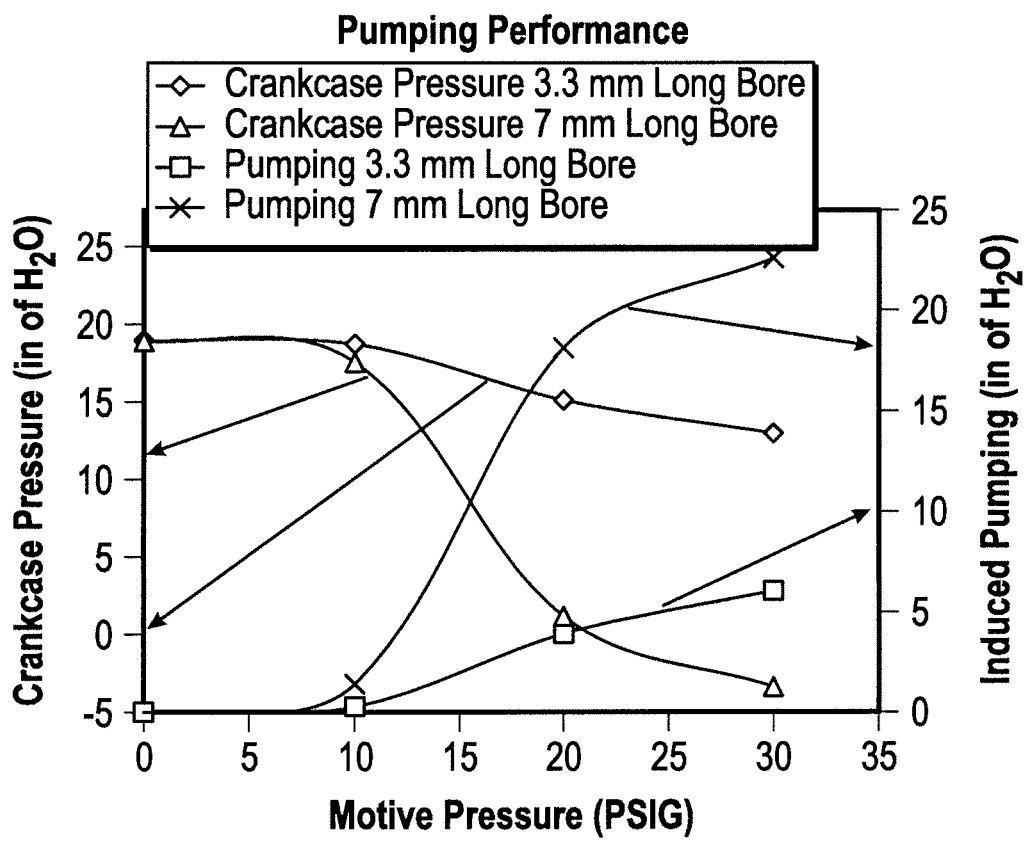
Figure 11:
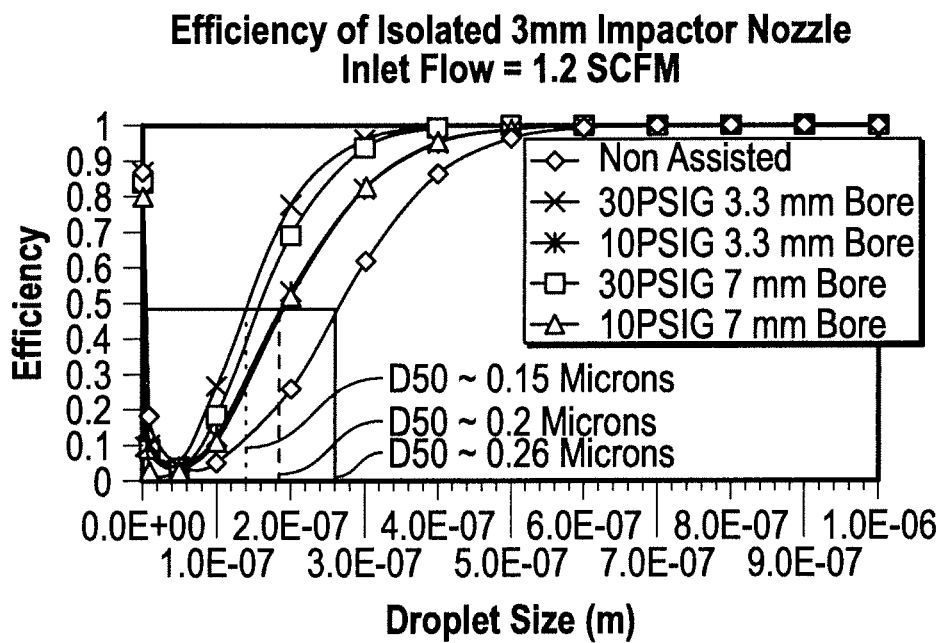
Figure 12:
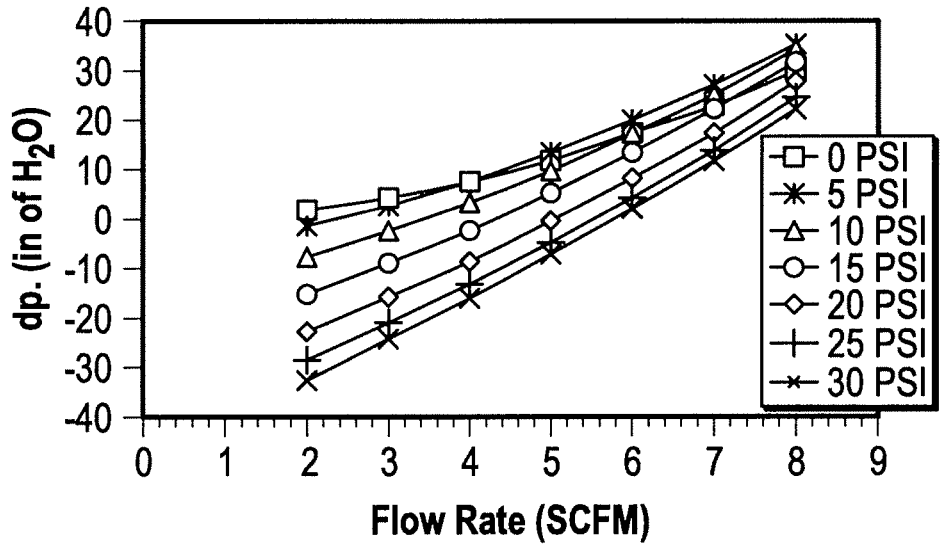
Figure 13:
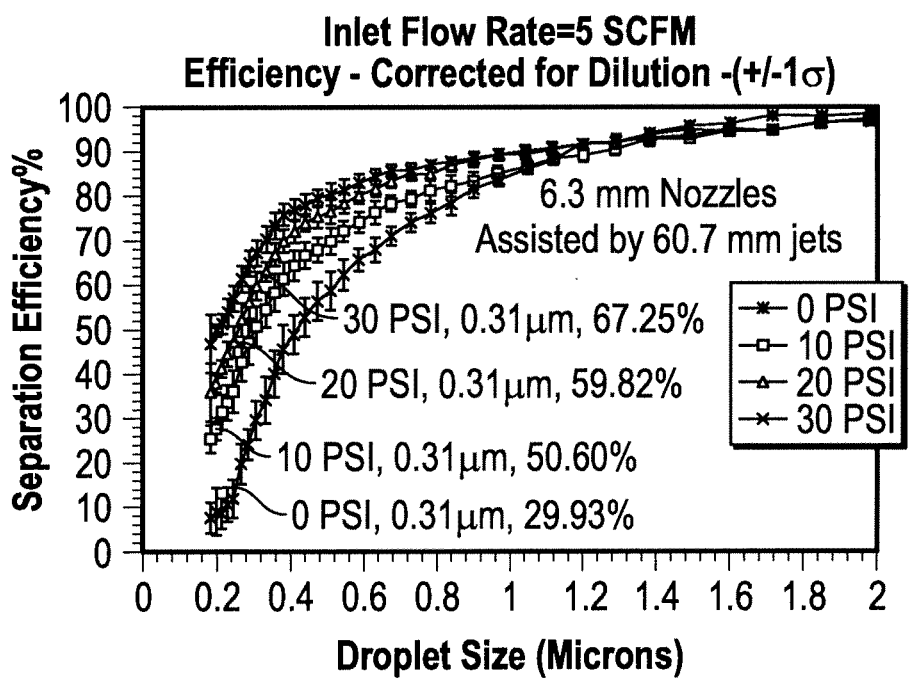
Figure 14:
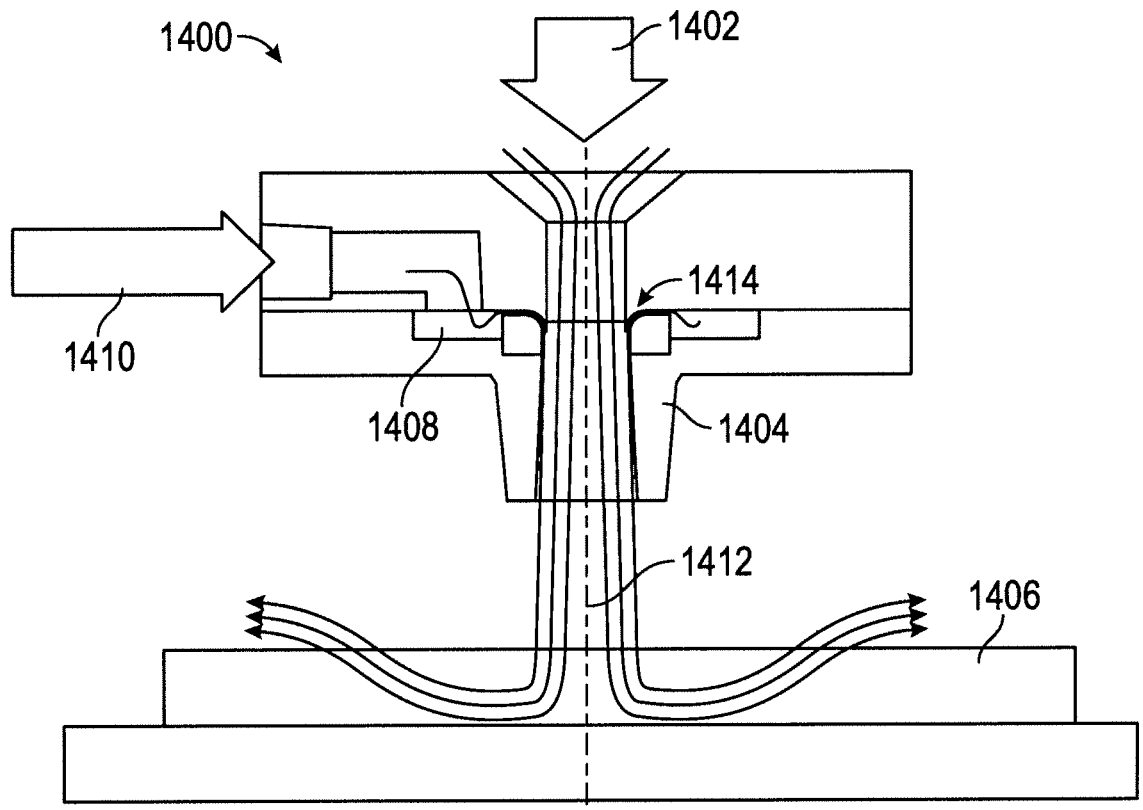

Referring to FIG. 4, a cross sectional view of a central jet system 400 of a gas-liquid separator for a CV system with various boundary conditions is shown according to an exemplary embodiment. The central jet system 400 is similar to the central jet system 100 of FIGS. 1-3. The central jet system 400 includes an impactor nozzle 402 that directs a flow of blow-by gases towards impaction media 404. The impactor nozzle 402 has a diameter of 3 mm and a height of 3.3 mm. In an alternative arrangement, the impactor nozzle 402 has a diameter of 3 mm and a height of 7 mm (e.g., as shown in FIG. 7). The central jet system 400 includes a motive jet nozzle 406 directing a high-velocity jet of clean air into the impactor nozzle 402. The motive jet nozzle 406 has a diameter of 0.9 mm. The motive jet nozzle 406 is supplied by a pressurized air supply 408 (e.g., from a turbo charger of an internal combustion engine) at a pressure of zero psig (i.e., "no assist"), a pressure of 10 psig, a pressure of 20 psig, or a pressure of 30 psig.

Figure 15:
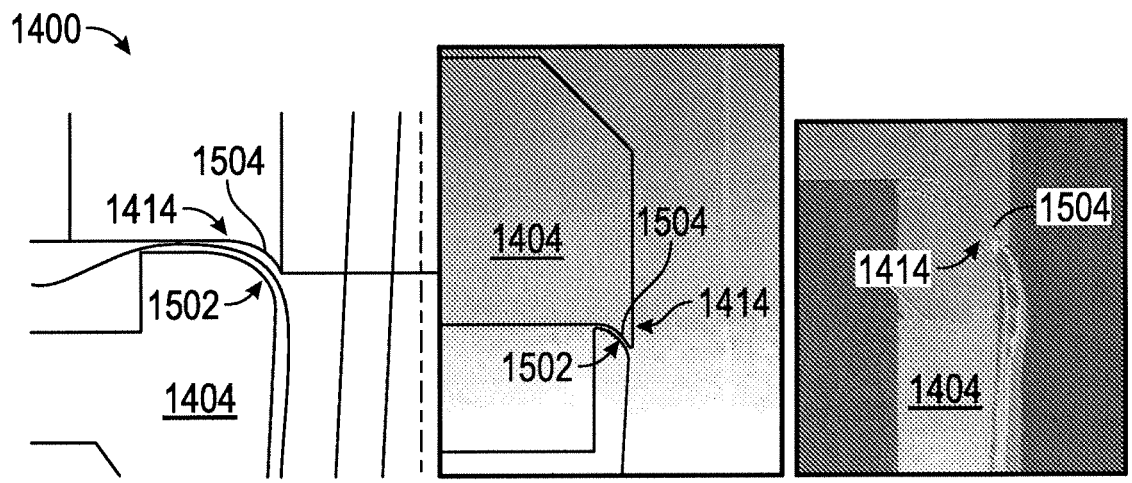

A theoretical study was performed on the central jet system 400 using CFD to understand the boost in pumping and enhancement of aerosol separation provided by the central jet. The results of the theoretical study were compared with a baseline model consisting of a 3 mm isolated impactor nozzle (i.e., a similar impactor nozzle to that of the central jet system 400 without the additional pumping effect caused by the motive jet nozzle of central jet system 400) at a blow-by mass flow rate of around 1.2 SCFM, which causes a pressure drop of 19.3" of $H_2O$. The results of the study are discussed in further detail below with respect to FIGS. 5 through 13.

Referring to FIG. 5, contours of velocity magnitude (capped at 200 m/s) for a no assist situation and for two different motive jet nozzle 406 pressures: 10 and 30 PSIG are shown. According to contours, the flow is accelerated to very high velocities on/near the central axis of the impactor nozzle 402. This leads to high velocity flow penetration into the impaction media 404. The inertial impaction mechanism inside the fibrous impaction media 404 is a strong function of the aerosol Stokes number, which depends upon the local aerosol velocity. The impaction media 404 may be a flow-through media that allows the flow to pass through the impaction media 404. The mass average velocity inside the porous impaction media 404, which is another parameter that indicates higher performance, is also shown in FIG. 5.

Referring to FIG. 6, the flow pathlines released from the boundary of the motive jet nozzle 406 are shown. Although the pathlines never reach the central axis of the impactor nozzle 402, the pathlines are accelerated to very high velocity by the motive jet flow in both the 10 and 30 PSIG cases.

Referring to FIG. 7, the pumping performance (or reduction of the pressure differential) of the central jet impactor compared to the baseline design is shown. The baseline design has a pressure drop of around 19.3" of $H_2O$. At 10 PSIG motive pressure, there is very little pumping performance, but as the motive pressure is increased, the pumping performance improves moderately to around 6" of $H_2O$. This particular geometry of the central jet nozzle does not provide much pumping because the mixing bore is not long enough to enable effective momentum transfer to the surrounding fluid. The motive central jet almost acts like a freely expanded (i.e., without mixing bore) jet expected at high pressures (20 PSI and above).

Referring to FIG. 8, a comparison between the efficiency between the baseline non-assisted impactor and a 3.3 mm bore central jet impactor is shown. The D50 cut size is shifted to the left with the increase in boost pressure due to higher oil droplet velocity inside the media zone, which leads to greater inertial separation.

Referring to FIG. 9, a comparison in velocity between a 3.3 mm impactor nozzle mixing bore length and a 7 mm impactor nozzle mixing bore length is shown. The comparison includes both the 30 and 10 PSIG motive pressures. As seen in the comparison, pumping performance may be improved by increasing the mixing bore length. For the 30 PSIG case, there is a slight drop in the mass weighted average velocity inside in the media zone. For the 10 PSIG case, there is not much difference between the two lengths of mixing bores.

Referring to FIG. 10, a graph comparing the pumping performance of the impactor nozzle having the 3.3 mm mixing bore to the impactor nozzle having the 7 mm mixing bore is shown. With the increase in the length of the mixing bore, the pumping performance of the jet pump improves substantially. With the 7 mm bore at 30 PSIG, the crankcase pressure is about 3" of $H_2O$, which amounts to about 23" of $H_2O$ pumping (vs. about 6" of $H_2O$ pumping for the 3.3 mm version).

Referring to FIG. 11, a comparison in separation efficiency between the 3.3 mm and 7 mm mixing bores is shown. There is a negligible drop in efficiency for the longer mixing bore design, but still a substantial improvement over the baseline case.

Referring to FIG. 12, a test pressure drop map for crankcase flows ranging from 2 SCFM to 8 SCFM and motive pressures ranging from 0 PSI to 30 PSI is shown. As shown in FIG. 12, the pumping action created by the high velocity jet as seen in CFD thereby proving the trend seen in CFD. Pressure drop values below zero indicate crankcase is under vacuum. There is no pumping effect for 5, 10 and 15 PSI at higher crankcase flow due to the fact that jet velocity and nozzle velocities are close to each other. There is greater than an 80% reduction in crankcase pressure at a set design point of 6 SCFM and 30 PSI.

Referring to FIG. 13, a test efficiency curve at various droplet sizes and at different motive pressures is shown. FIG. 13 also calls out the 0.3 micron separation efficiency. The general trend seen is that the separation efficiencies at smaller droplet sizes increases with increase in motive pressure due to the high velocity jet impaction.

The central jet concept can be optimized by using a still-longer mixing bore and/or smaller ratio of mixing bore diameter/motive jet diameter.

Thus there are improvements both in pressure loss and separation efficiency by the use of a high pressure/velocity central jet in an inertial impactor. The central jet design provides an efficiency enhancement above and beyond the simple dP reduction effect. The centering effect of the high velocity at the central axis of the impactor nozzle pulls the lower velocity aerosol-laden sheath towards the central axis and thereby improves penetration and velocity in the impaction zone. In other words, comparing the separation efficiency of a design with the pumping jet turned "off", at the same air flowrate, and ignoring the much higher pressure drop, the efficiency of the jet pump assisted nozzle is significantly improved, with a significant cut-size (D50) left-ward shift.

Coanda Effect Jet Arrangement

Referring to FIG. 14, a cross sectional view of a ring jet system 1400 of a gas-liquid separator for a CV system is shown according to an exemplary embodiment. The ring jet system 1400 separates oil aerosol contained in blow-by gases 1402 from the air in the blow-by gases 1402 in a similar manner as described above with respect to system 100. The ring jet system 1400 differs from system 100 in that the ring jet system 1400 utilizes the Coanda-effect to accelerate the blow-by gases 1402 through an impactor nozzle 1404 towards a porous impaction surface 1406. The Coanda effect describes the tendency of a higher-velocity jet flow to move towards and adhere to a nearby surface, even if that surface curves away from the jet direction. The porous impaction surface 1406 may be either permeable or impermeable. The ring jet system 1400 employs a circular plenum 1408 surrounding the impactor nozzle 1404 that allows a separate stream of clean pressurized air 1410 (e.g., turbo boost air), exhaust gas, or other suitable gas to jet radially inwards towards the impactor nozzle 1404 and towards the central axis 1412. A pressurized gas jet nozzle 1414 injects a high-velocity gas stream into the blow-by gas 1402 stream between the upstream end of the impactor nozzle 1404 and the downstream end of the impactor nozzle 1404. The pressurized gas jet nozzle forms a ring around the impactor nozzle 1404. The pressurized gas jet nozzle 1414 creates a ring jet, or a sheath jet, that exits the gas jet nozzle 1414 at a high velocity. The ring jet creates shear forces on the blow-by gases 1402 passing through the impactor nozzle 1402. The shear forces cause acceleration and pumping of the blow-by gases 1404 (i.e., the shear forces reduce the pressure drop caused by the flow of blow-by gases 1402 through the impactor nozzle 1402, resulting in a higher velocity stream that allows for increased impaction separation efficiency). The geometry of the impactor nozzle 1402 and the pressurized gas jet nozzle 1414 provides a flow rate to enable a dP reduction in excess of 20 in $H_2O$ for the by-pass gases 102 (i.e., crankcase pressure is neutral despite an equivalent nozzle dP of greater than 30 in $H_2O$ if the motive flow were shut off).

Referring to FIG. 15, close-up cross sectional views of the pressurized gas jet nozzle 1414 of system 1400 are shown. The Coanda effect is created by pumping air 1410 into a circular plenum 1408 with a radial gap (i.e., the pressurized gas jet nozzle 1414) surrounding the impactor nozzle 1404. The circular plenum 1408 surrounds the impactor nozzle 1404 and injects the high-velocity gas stream radially into the impactor nozzle 1404. The circular plenum 1408 uniformly feeds the small gap to control jet flow. The gap is configured with a rounded discharge edge 1502 on the lower side and a downward turned lip 1504 on the upper side, which together cause the ring-shaped jet to "attach" to the impactor nozzle's inner diameter, assisted by the Coanda effect. The downward turned lip 1504 is turned in the direction of the flow of blow-by gases 1404 to direct the air 1410 into the impactor nozzle 1404. This cylindrical air jet is at substantially higher velocity relative to the central core of the blow-by gases 1402 stream, and the resulting mixing/shear creates a pumping effect which accelerates the blow-by gases 1404 stream and greatly reduces the pressure drop through the impactor nozzle 1404. The ring jet system 1400, which, similar to the central jet nozzle described above with respect to system 100, uses momentum transfer from a high velocity flow (a ring of flow, in this case) to a lower velocity core flow. The Coanda effect causes the ring jet flow to stick to a wall, in this case the inner diameter of the impactor nozzle, and to dissipate more slowly than a freely expanding jet. Test results of the ring jet system 1400 as evaluated using CFD are described in further detail below with respect to FIGS. 16-18.

Figure 16:
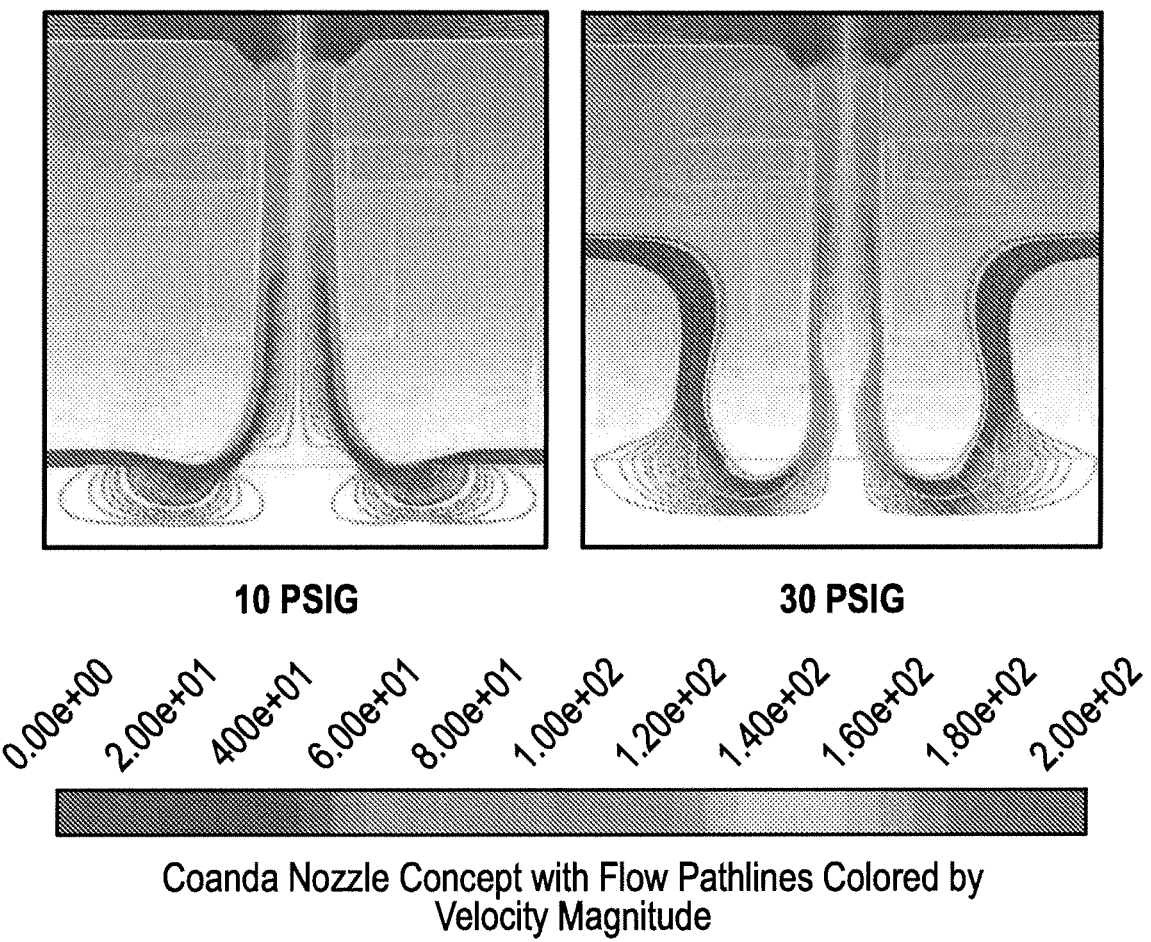

Referring to FIG. 16, the pathlines through the impactor nozzle 1404 for both 10 PSIG and 30 PSIG boost pressures are shown. The pathlines deviate from the center. The deviation is caused by the redistribution of the velocity field to satisfy a continuity equation as the mass flow rate at the upstream end of the impactor nozzle 1404 is fixed.

Figure 17:
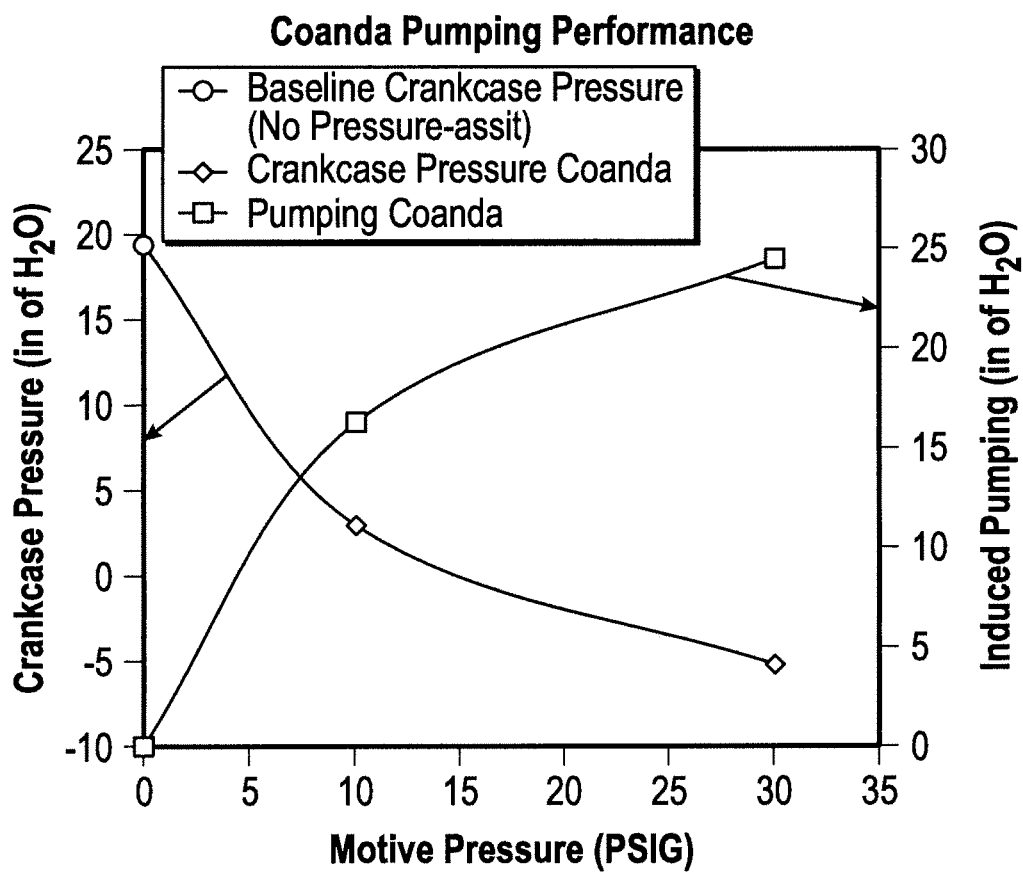

Referring to FIG. 17, the pumping performance of the Coanda effect nozzle of system 1400 is compared to a baseline model. The baseline model used in the comparison is the same baseline model used for the comparisons discussed above with respect to system 100. Specifically, the baseline model consists of a 3 mm isolated nozzle at a blow-by mass flow rate of around 1.2 SCFM, which causes a pressure drop of 19.3" of $H_2O$.

Figure 18:
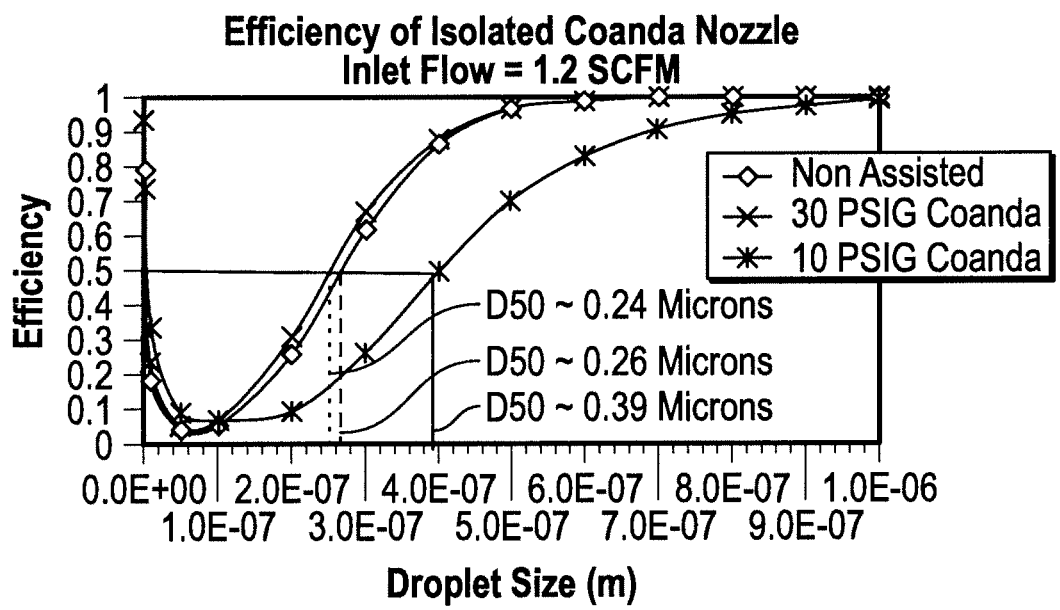

Referring to FIG. 18, the separation efficiency curves for the Coanda nozzle of system 1400 are compared with the baseline model. The D50 at 30 PSIG is 0.24 microns as compared to baseline value of 0.26 microns. At a lower motive pressure of 10 PSIG, the efficiency of the Coanda concept was somewhat reduced when compared to the baseline (cut size of 0.39 microns vs. 0.26 for baseline).

OTHER EXAMPLES

Both of the above described embodiments allow design control over crankcase pressure. The crankcase pressure can be made neutral, negative, or positive, depending on the jet pump design ratios, motive pressure, and motive flowrate.

Either of the above described embodiments may be adapted to include a perforated porous surface (circular holes in porous zone aligned with jet to further enhance porous zone penetration) and/or a conical support surface as taught by U.S. Pat. No. 8,202,339.

Either of the above described embodiments may be adapted to employ 2-dimensional linear "slot nozzles" instead of the axisymmetric round-nozzle configurations illustrated.

The central jet concept can include multiple motive central jet nozzles per impactor nozzle. For example, three or six motive nozzles could be provided in an array and spread across the impactor nozzle cross section.

Either of the above described embodiments may be employed with a non-porous zone impaction surface (i.e., collection media). For example, the impaction surface can be flat, smooth, or rough but nonpermeable.

Either of the above described embodiments may be used in conjunction with variable impactor schemes, where fixed and/or variable impaction could be jet-assisted to give flatter performance response vs. blow-by flowrate. Alternatively, one or more fixed or variable impactor nozzles could be in parallel with motive central jet enhanced nozzles.

The pressurized motive gas flow for either example could be sourced from engine charge-air (at turbo-boost pressure either before, after, or at the charge-air cooler housing). One possible location could be a low point on the charge air cooler, ordinarily prone to undesirable liquid accumulation such as oil. Drawing motive air from this location would transfer this liquid to the impactor separator and ultimately back to the engine's oil sump via the impactor separator housing's drain port. Other motive air sources include a compressed air tank, an air compressor, an exhaust gas recirculation line, an exhaust manifold, or any general gas pressure source.

The motive pressure and/or flowrate of compressed gas could be controlled with a throttle valve based on feedback from an ECM or other sensor(s). A controller can tailor the impaction separation efficiency based upon the needs of the engine/customer in that operational condition/state. Controlling the flowrate of compressed gas can also reduce parasitic loss (bleed air) in certain operating conditions.

Jet-enhanced impaction can be combined with jet-pump assisted oil-return, such as described in U.S. Pat. Nos. 7,699,029 or 7,870,850. The jet pumps can use a common pressurized gas source and have a single pressurized gas attachment point on the air-oil separator housing.

The impaction media can be flow-through media and/or not necessarily backed by a support surface. For example, the impaction media can be the inner diameter or outer diameter surface of a cylindrical tube of fibrous or porous media, where substantially all of the flow exiting the motive and impactor nozzles eventually passes through the impaction media from one side to the other.

The flow exit side (downstream end) of the impactor nozzle could be in direct contact with the impaction media, either at the collection media surface or penetrating a distance into the collection media. The motive jet enables this by supplying additional energy to drive all gas flow to enter the collection media without excessive crankcase back pressure.

When the gas-liquid separator is used as a crankcase ventilation air-oil separation device, it could be mounted remotely from the engine, such as on the intake air cleaner housing or intake ducting. This is enabled by the use of a motive gas source having a temperature greater than ambient or greater than the blow-by temperature. In other words, the air-oil separator can be located remotely from the crankcase ventilation system and the high velocity gas stream can be hotter than the gas-liquid stream. Up to five fluid lines could be integrated into or along the duct connecting the air cleaner housing to the engine: (a) intake air, (b) blow-by gas from engine, (c) motive air supply, (d) separated oil drain, and/or (e) cleaned blow-by flow. Potentially all of these fluid connections could be managed at the turbocharger housing. This could benefit engine manufacturers by eliminating the burden of crankcase ventilation device design and integration, as well as the cost of installation and accessory mounting components at the point of engine manufacture.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

What is claimed is:

1. A gas-liquid separator, comprising:
   a housing defining a pressurized air chamber;
   a manifold plate defining at least one motive jet nozzle, the at least one motive jet nozzle receiving pressurized clean air from the pressurized air chamber upstream of the at least one motive jet nozzle;
   an impactor nozzle plate spaced from and positioned downstream of the manifold plate, the impactor nozzle plate defining at least one impactor nozzle; the at least one impactor nozzle configured to receive a combination of (a) blow-by gases from a crankcase of an internal combustion engine and (b) a high-velocity jet of the pressurized clean air, the combination received downstream from the at least one motive jet nozzle so as to create a vacuum/mixing effect, thereby accelerating the blow-by gas; and
   an impaction surface positioned downstream of the manifold plate and the impactor nozzle plate, the impaction surface positioned such that the accelerated combination of blow-by gas and pressurized clean air impacts the impactor surface, thereby separating aerosols from the blow-by gas.

2. The gas-liquid separator of claim 1, wherein each of the at least one impactor nozzle is axially aligned with a respective one of the at least one motive jet nozzle.

3. The gas-liquid separator of claim 1, where each of the at least one impactor nozzle is not aligned with any of the at least one motive jet nozzle.

4. The gas-liquid separator of claim 1, wherein each of the at least one motive jet nozzle comprises an orifice drilled into the manifold plate.

5. The gas-liquid separator of claim 1, wherein each of the at least one motive jet nozzle comprises an orifice hole molded into the manifold plate.

6. The gas-liquid separator of claim 1, wherein the high-velocity jet of the pressurized clean air is provided from a turbocharger associated with the internal combustion engine.

7. The gas-liquid separator of claim 1, wherein the at least one motive jet nozzle comprises a plurality of motive jet nozzles.

8. The gas-liquid separator of claim 7, wherein the at least one impactor nozzle comprises a plurality of impactor nozzles.

9. The gas-liquid separator of claim 1, wherein the impaction surface comprises a porous impaction surface.

10. A method for enhancing collection of liquid particles in an inertial gas-liquid separator, the method comprising:
    receiving a stream of pressurized clean air from a pressurized air chamber;
    directing the stream of pressurized clean air through at least one motive jet nozzle formed in a manifold plate;
    receiving, downstream of the manifold plate, a stream of blow-by gases from a crankcase of an internal combustion engine;
    directing a combination of the stream of pressurized clean air and the stream of blow-by gases through at least one impactor nozzle formed in an impactor nozzle plate, the stream of blow-by gases received downstream from the at least one motive jet nozzle; and
    impacting the combined stream of pressurized clean air and blow-by gas against an impaction surface downstream of the impactor nozzle plate, thereby separating aerosols from the blow-by gas.

11. The method of claim 10, wherein each of the at least one impactor nozzle is axially aligned with a respective one of the at least one motive jet nozzle.

12. The method of claim 10, where each of the at least one impactor nozzle is not aligned with any of the at least one motive jet nozzle.

13. The method of claim 10, wherein each of the at least one motive jet nozzle comprises an orifice drilled into the manifold plate.

14. The method of claim 10, wherein each of the at least one motive jet nozzle comprises an orifice hole molded into the manifold plate.

15. The method of claim 10, wherein the combination stream of pressurized clean air and blow-by gas causes the blow-by gas to move radially inward, thereby increasing a depth of penetration of the blow-by gas into the porous impaction surface.

16. The method of claim 10 wherein the at least one motive jet nozzle comprises a plurality of motive jet nozzles.

17. The method of claim 16, wherein the at least one impactor nozzle comprises a plurality of impactor nozzles.

18. The method of claim 10, wherein the impaction surface comprises a porous impaction surface.

* * * * *